United States Patent [19]

Taylor

[11] Patent Number: 5,192,089
[45] Date of Patent: Mar. 9, 1993

[54] PEDAL-OPERATED SCOOTER

[76] Inventor: Walter R. Taylor, Rte. 2, Box 181, Rayville, La. 71269

[21] Appl. No.: 796,471

[22] Filed: Nov. 22, 1991

[51] Int. Cl.[5] ............................................. B62M 1/00
[52] U.S. Cl. ................................... 280/221; 280/251
[58] Field of Search ............... 280/220, 221, 223, 241, 280/251, 252, 253, 11.115, 255

[56] References Cited

U.S. PATENT DOCUMENTS

| | | | |
|---|---|---|---|
| 1,237,969 | 8/1917 | Stocks | 280/251 |
| 1,998,293 | 4/1935 | Sweany | 280/221 |
| 3,175,844 | 3/1965 | Whitehouse | 280/221 |
| 3,415,540 | 12/1968 | Portnoff | 280/221 |
| 4,124,222 | 11/1978 | Moe et al. | 280/221 |
| 4,186,934 | 2/1980 | Collings | 280/221 |
| 4,271,712 | 6/1981 | White | 280/251 |
| 4,666,173 | 5/1987 | Graham | 280/255 |
| 4,761,014 | 8/1988 | Huang | 280/258 |
| 4,811,964 | 3/1989 | Horn | 280/255 |
| 4,915,403 | 4/1990 | Wild | 280/221 |

FOREIGN PATENT DOCUMENTS 102054 11/1923 Switzerland ...................... 280/221

Primary Examiner—Margaret A. Focarino
Assistant Examiner—Kevin Hurley
Attorney, Agent, or Firm—John M. Harrison

[57] ABSTRACT

A pedal-operated scooter which is characterized by a scooter frame having front and rear wheels, handle bars for steering the front wheel and a pedal-operated drive mechanism for unidirectionally propelling the rear wheel. The drive mechanism includes a pedal pivotally mounted on the scooter frame, with front and rear cables extending around corresponding cable pulleys and attached to corresponding sprocket chains. The sprocket chains engage corresponding parallel sprockets adapted for alternately driving the rear wheel when rotated in the forward direction and disengaging for free rotation in the opposite direction, responsive to pivoting of the pedal. A spring connects one end of the sprocket chains and engages a pair of spaced chain pulleys for alternately maintaining one set of the sprocket chains and connecting cables in tension responsive to free rotation of the corresponding sprocket when the opposite sprocket is being driven by the opposing sprocket chain and cable.

20 Claims, 2 Drawing Sheets

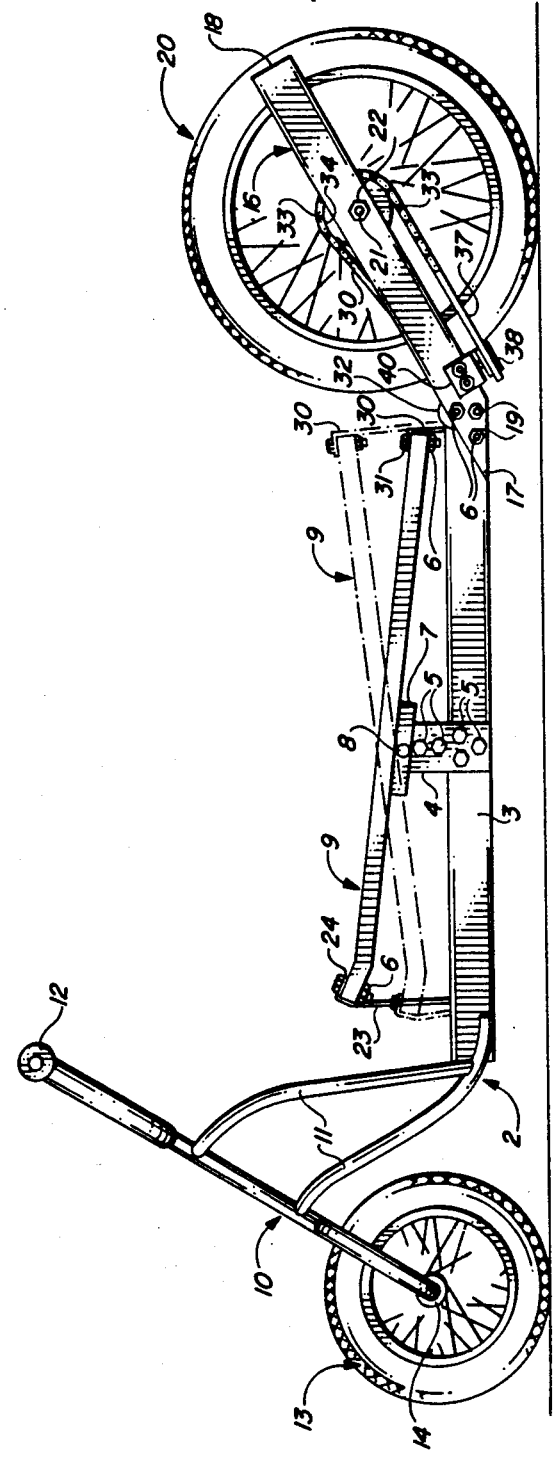
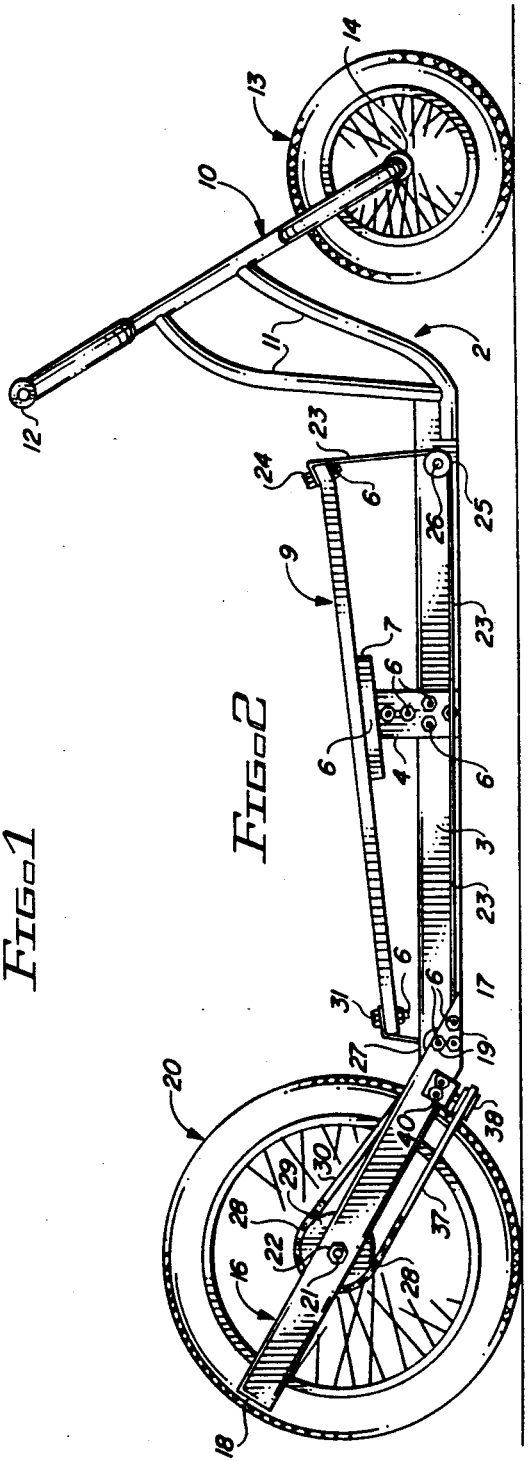

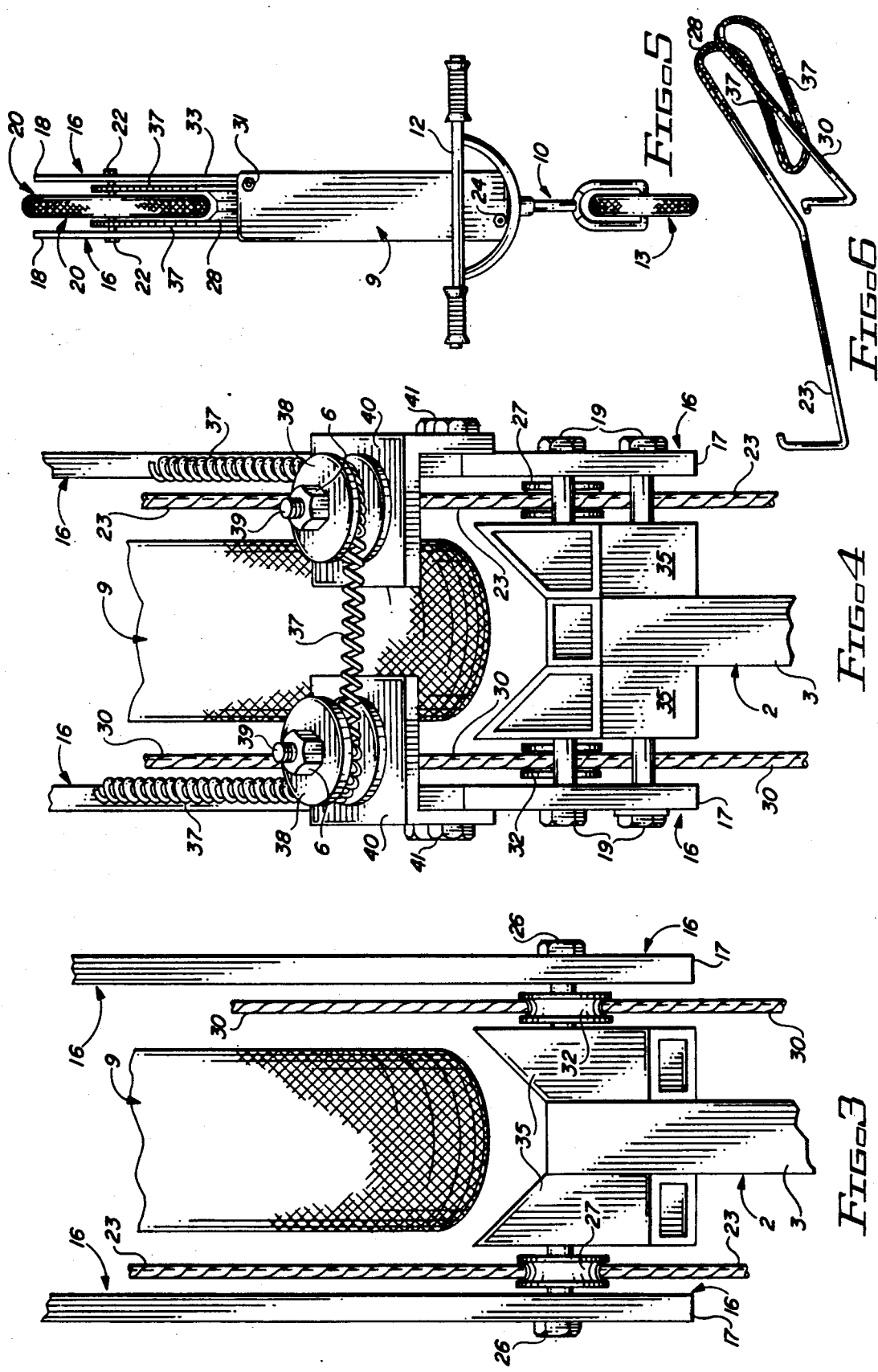

PEDAL-OPERATED SCOOTER

BACKGROUND OF THE INVENTION

1. Field of the Invention

This invention relates to operator-propelled two-wheeled vehicles and more particularly, to a linearly pedal-operated scooter which is driven by a pedal-driven cable, chain and spring drive mechanism. In a preferred embodiment the pedal-operated scooter of this invention is characterized by a scooter frame having front and rear wheels and handle bars connected to the front wheel for steering. A pedal is pivotally mounted at approximately the center thereof to the frame and front and rear cables extend around cable pulleys rearwardly to corresponding parallel sprocket chains, which engage separately parallel sprockets mounted on the rear wheel axle and attached to the rear wheel. The opposite ends of the sprocket chains are connected to a spring which extends around corresponding spring pulleys mounted on the frame. The sprockets are designed to sequentially drive the rear wheel forwardly and sequentially disengage the rear wheel for free reverse rotation, responsive to pivoting of the pedal with respect to the frame by an operator.

2. Description of the Prior Art

Conventional scooters have long been known in the art and a typical scooter design includes a low, two-wheeled vehicle having handle bars connected to the front wheel for steering and a platform connecting the front and rear wheels. Typically, the operator stands on the connecting frame member with one foot and propels the scooter with the other foot.

Scooters which are propelled by the weight or stepping force of a rider or operator using chain sprockets similar to bicycle propulsion are also known in the art. However, many of these scooters and similar vehicles are characterized by complex propulsion mechanisms which are difficult to build, operate and maintain. Foot pedal drive systems have been used in prior art bicycle and scooter vehicles for propulsion and typical of these foot pedal propulsion devices is the Foot Pedal Drive for Bicycles detailed in U.S. Pat. No. 4,666,173, dated May 19, 1987, to G. E. Graham. The patent describes a bicycle having pedal bars pivoted on the frame near the rear wheel, with a pedal sprocket positioned above the rear wheel. A connecting member couples the rear end of each of the pedal bars to the pedal sprocket and further includes a conversion mechanism, whereby up-and-down movement of the push bars induces relative movement of the pedal sprocket. Foot pedals are mounted on the front end of the pedal bars and downward pressure by a rider on the foot pedals forces upper movement of the connection members and corresponding rotation of the pedal sprocket for driving the bicycle. U.S. Pat. No. 4,761,014, dated Aug. 2, 1988, to K. H. Huang, is entitled "Propulsion of Scooters". Detailed is a scooter of an ordinary type but equipped with an improved mechanical drive for the rear wheel or wheels, which drive includes a ratchet mechanism for driving the rear wheel, a stepping lever for transferring the stepping force of the rider to the ratchet mechanism and a retrieving mechanism for raising the stepping lever to the original position as the stepping force is released. The scooter can therefore be propelled by the intermittent force of the rider to advance forwardly. U.S. Pat. No. 4,915,403, dated Apr. 10, 1990, to Charles Wild, et al, details a "Skateboard With Mechanical Drive". The skateboard includes a frame upon which a pedal is pivotally mounted and when the pedal is pressed downwardly, its movement is converted by means of a push rod, a crank and a toothed segment into rotational movement, which is transmitted to a gear train. The output pinion of the gear train is fixed to the shaft of two drive rollers. The push rod in each case is connected by means of a ball and socket joint to both the pedal and tooth segment, such that transmission of the drive force is insured, even during tilting of the pedal which is caused by riding around curves.

It is an object of this invention to provide a pedal, cable, chain and spring-operated scooter.

Another object of the invention is to provide an operator-propelled scooter having a pivoting pedal connected to a pair of alternately forward-driving and reverse-rotating sprockets by means of a cable, sprocket chain and spring system, for propelling the scooter in a forward direction.

Still another object of this invention is to provide a pedal-operated scooter which includes a frame provided with a front wheel fitted with handle bars for steering, a rear wheel provided with a pair of spaced, parallel unidirectionally driving and freely reverse-rotating sprockets, a pedal pivotally mounted near the center thereof to the frame and front and rear cables connected to sprocket chain segments fitted on the sprockets, with a spring connecting the opposite ends of the sprocket chains, for driving the scooter unidirectionally responsive to pivoting of the pedal with respect to the frame.

SUMMARY OF THE INVENTION

These and other objects of the invention are provided in a pedal-operated scooter which includes a scooter frame having a front wheel, handle bars for steering the front wheel, a rear drive wheel fitted with a pair of spaced forwardly driving and rearwardly free wheeling sprockets, a foot pedal mounted near the center thereof to the frame, a front cable mounted on the front portion of the pedal and extending by means of cable pulleys to a length of first sprocket chain fitted around one of the sprockets, a rear cable mounted on the rear portion of the pedal and fitted by means of a cable pulley to a length of second sprocket chain fitted around the second sprocket and a coil spring fitted around spaced spring pulleys and connecting the opposite ends of the lengths of sprocket chains, to facilitate initial application of force on one of the sprockets and driving the rear wheel forwardly responsive to pivoting of the foot pedal in one direction and tensioning the front cable and first length of sprocket chain, while releasing tension in the rear cable and second length of sprocket chain due to free reverse-rotation of the opposite sprocket by operation of the coil spring and subsequently tensioning the rear cable and second length of sprocket chain responsive to reverse operation of the foot pedal while releasing tension in the front cable and first length of sprocket chain.

The invention will be better understood by reference to the accompanying drawings wherein:

FIG. 1 is a left side view of a preferred embodiment of the pedal-operated scooter of this invention;

FIG. 2 is a right side view of the pedal-operated scooter illustrated in FIG. 1;

FIG. 3 is a top sectional view of a preferred cable pulley configuration in the pedal-operated scooter;

FIG. 4 is a bottom sectional view of a preferred spring and spring pulley configuration in the pedal-operated scooter;

FIG. 5 is a top view of the pedal-operated scooter illustrated in FIGS. 1 and 2; and FIG. 6 is a typical cable-chain-spring mounting configuration.

DESCRIPTION OF THE PREFERRED EMBODIMENTS

Referring initially to FIGS. 1-6 of the drawings, the pedal-operated scooter of this invention is generally illustrated by reference numeral 1. The pedal-operated scooter 1 includes a frame 2, having a horizontal pedal keel 3 which receives a wheel fork 10 on one end by means of fork support bars 11 and a pair of rear wheel bars 16 projecting in parallel, angular relationship from the opposite end of the pedal keel 3. The fork support bars 11 are typically welded to the pedal keel 3, while the rear wheel bars 16 are preferably mounted to the pedal keel 3 by means of bar mount bolts 19 and corresponding nuts 6. Each of the rear wheel bars 16 is characterized by a proximal end 17, which is attached to the pedal keel 3 and a distal end 18, which projects upwardly in angular relationship with respect to the pedal keel 3, as illustrated. A front wheel 13 is conventionally rotatably mounted on the bottom end of the wheel fork 10 by means of a front wheel axle 14 and is held in place by corresponding axle nuts (not illustrated). Similarly, a rear wheel 20 is rotatably mounted between and at the approximate center of the respective rear wheel bars 16, by means of a rear wheel axle 21 and corresponding axle nuts 22. A fulcrum 4 is secured to the approximate midpoint top of the pedal keel 3 by means of fulcrum bolts 5 and corresponding nuts 6. A pedal mount plate 7 is secured to the bottom of a flat or slightly concave pedal 9 and is mounted on the top end of the fulcrum 4 by means of a pivot bolt 8 and corresponding nuts 6. The preferably slightly concave pedal 9 is pivotally attached to the fulcrum 4, such that an operator (not illustrated) standing on the concave top surface of the pedal 9 can grasp the handle bars 12, attached to the top of the wheel fork 10, for steering the front wheel 13. As further illustrated in FIGS. 2 and 3, one end of a front cable 23 is attached to the front end of the pedal 9 by means of a front cable bolt 24 and corresponding nut 6. The front cable 23 extends downwardly from the front end of the pedal 9 around a front cable forward pulley 25, which is rotatably secured to a spacer 35, welded or otherwise attached to the pedal keel 3, by means of a pulley bolt 26. The front cable 23 extends from the front cable forward pulley 25 rearwardly, parallel to the pedal keel 3 and around a front cable rear pulley 27, also rotatably secured to a spacer 35 in spaced relationship with respect to the front cable forward pulley 25. From the front cable rear pulley 27 the front cable 23 projects upwardly in angular relationship and is secured to one end of a front cable sprocket chain 28, which is wound around a front cable chain sprocket 29, secured to the hub (not illustrated) mounted on the rear wheel axle 21 of the rear wheel 20. As illustrated in FIG. 1, one end of a rear cable 30 is secured to the rear end of the pedal 9 by means of a rear cable bolt 31 and corresponding nuts 6 and the rear cable 30 projects downwardly from the pedal 9, around a rear cable pulley 32 and from the rear cable pulley 32 in angular relationship to one end of a rear cable sprocket chain 33, also secured to the hub mounted on the rear wheel axle 21 of the rear wheel 20.

The opposite ends of the front cable sprocket chain 28 and rear cable sprocket chain 33 are connected by a spring 37, which projects around a pair of spring pulleys 38, mounted in spaced relationship on the parallel rear wheel bars 16 by means of spring pulley brackets 40 and spring pulley bolts 39, secured by nuts 6, as illustrated in FIGS. 4-6. The front cable chain sprocket 29 and rear cable chain sprocket 34 are both mounted on the wheel hub (not illustrated) of the rear wheel 20 in spaced, parallel relationship, such that they each independently and sequentially engage the wheel hub in driving relationship when rotated in the forward direction, to propel the pedal-operated scooter forwardly. Furthermore, both the front cable chain sprocket 29 and rear cable chain sprocket 34 operate to sequentially independently freely reverse rotate in the opposite rotational direction, responsive to the bias in the spring 37.

Referring again to the drawings, in operation, the pedal-operated scooter of this invention is propelled by an operator (not illustrated) standing with one foot on the front portion and the other foot on the rear portion of the pedal 9 and grasping the handle bars 12, as follows. Forcing the front portion of the pedal 9 downwardly from the position illustrated in FIG. 1 to the position illustrated in phantom in FIG. 1 initially applies tension to the rear cable 30 and releases tension in the front cable 23. As tension is applied to the rear cable 30, this tension extends from the rear cable 30 to the rear cable sprocket chain 33 and the rear cable chain sprocket 34. Since the rear cable chain sprocket 34 is mounted on the rear axle hub (not illustrated) which normally rotates on the rear wheel axle 21 such that rotation in the clockwise direction as viewed in FIG. 2 drives the rear wheel 20 in the clockwise direction, this action propels the pedal-operated scooter 1 forwardly. Corresponding release of tension in the front cable 23 causes a relaxing of tension in the front cable sprocket chain 28, and the spring 37 compresses to accommodate this easing of tension and maintain a spring-induced tension in the front cable 23 and front cable sprocket chain 28. When the pedal 9 reaches its maximum point of travel as illustrated in phantom in FIG. 1, the operator's weight is transferred to the rear portion of the pedal 9, thereby forcing the pedal 9 to reverse in direction and pivot back into the original position illustrated in FIG. 1. This action applies tension to the front cable 23 and front cable sprocket chain 28, while relaxing tension in the rear cable 30 and rear cable sprocket chain 33. Accordingly, the front cable sprocket chain 29 is driven forwardly in the clockwise direction as the pedal-operated scooter 1 is viewed in FIG. 2, while the rear cable chain sprocket 34 "free wheels" or freely reverse rotates responsive to a reduction in tension in the rear cable 30 and operation of the spring 37, to maintain spring tension in the rear cable 30 and the rear cable sprocket chain 33. This repetitive rocking action of the pedal 9 on the fulcrum 4 continues to propel the pedal-operated scooter 1 forwardly at a speed determined by the intensity of weight shift by the operator.

It will be appreciated by those skilled in the art that the pedal-operated scooter of this invention is characterized by simplicity and ease of operation. Accordingly, maintenance is reduced and the various drive components can be quickly and easily changed or adjusted in a minimum of time. Furthermore, the forward speed of the pedal-operated scooter 1 can be easily controlled by the intensity with which the operator's weight is shifted from the front portion to the rear portion of the pedal 9.

It will also be appreciated by those skilled in the art that the pedal-operated scooter 1 may be fitted with conventional wheel brakes (not illustrated), according to the knowledge of those skilled in the art. Furthermore, when the operator terminates the pedalling action, the pedal-operated scooter 1 will coast, regardless of the position of the pedal 9.

While the preferred embodiments of the invention have been described above, it will be recognized and understood that various modifications may be made in the invention and the appended claims are intended to cover all such modifications which may fall within the spirit and scope of the invention.

Having described my invention with the particularity set forth above, what is claimed is:

1. A pedal-operated vehicle comprising a frame having at least two wheels; pedal means pivotally mounted on said frame for receiving an operator; a pair of sprockets carried by one of said wheels in forwardly-driving and rearwardly freely-rotating relationship and a pair of sprocket chains engaging said sprockets, respectively; first pulley means carried by said frame and a front cable engaging said first pulley means and having one end attached to the front portion of said pedal means and the opposite end of said front cable attached to one end of one of said sprocket chains; second pulley means carried by said frame and a rear cable engaging said second pulley means and having one end attached to the rear portion of said pedal means and the opposite end of said rear cable attached to one end of the other one of said sprocket chains; and bias means connecting the opposite ends of said sprocket chains, whereby said sprockets are alternately deployed in said forwardly-driving relationship for propelling said vehicle forwardly in drive mode and in said rearwardly free-rotating relationship, responsive to pivotal operation of said pedal means and the tension in said bias means, respectively.

2. The pedal-operated vehicle of claim 1 wherein said pedal means further comprises an elongated, slightly concave pedal.

3. The pedal-operated vehicle of claim 1 wherein said bias means further comprises a coil spring and further comprising at least one coil spring pulley carried by said frame for receiving said coil spring.

4. The pedal-operated vehicle of claim 1 wherein:
(a) said pedal means further comprises an elongated, slightly concave pedal; and
(b) said bias means further comprises a coil spring and further comprising at least one coil spring pulley carried by said frame for receiving said coil spring.

5. The pedal-operated vehicle of claim 1 wherein said first pulley means further comprises a first front cable pulley rotatably carried by said frame beneath said front portion of said pedal means and a second front cable pulley rotatably carried by said frame beneath said rear portion of said pedal means and said second pulley means further comprises a rear cable pulley rotatably carried by said frame beneath said rear portion of said pedal means.

6. The pedal-operated vehicle of claim 5 wherein said pedal means further comprises an elongated, slightly concave pedal.

7. The pedal-operated vehicle of claim 5 wherein said bias means further comprises a coil spring and further comprising at least one coil spring pulley carried by said frame for receiving said coil spring.

8. The pedal-operated vehicle of claim 1 wherein:
(a) said pedal means further comprises an elongated, slightly concave pedal oriented longitudinally with respect to said frame; and
(b) said bias means further comprises a coil spring and further comprising at least one coil spring pulley carried by said frame for receiving said coil spring.

9. A pedal-operated vehicle comprising a frame; handle bar means pivotally carried by one end of said frame and a front wheel rotatably connected to said handle bar means; a rear wheel rotatably supported by the opposite end of said frame; a first sprocket and a second sprocket carried by said rear wheel in parallel, alternating forwardly-driving and rearwardly freely-rotating relationship; elongated pedal means pivotally mounted on said frame; front cable pulley means rotatably carried by said frame and a front cable having one end attached to the front end of said pedal means, with the opposite end of said front cable extending around said front cable pulley means; a front cable sprocket chain engaging said first sprocket and having one end attached to said opposite end of said front cable; rear cable pulley means rotatably carried by said frame and a rear cable having one end attached to the rear end of said pedal means, with the opposite end of said rear cable extending around said rear cable pulley means; a rear cable sprocket chain engaging said second sprocket and having one end attached to said opposite end of said rear cable; bias pulley means carried by said frame; and bias means extending around said bias pulley means and connecting the opposite ends of said front cable sprocket chain and said rear cable sprocket chain, respectively, whereby said first sprocket and said second sprocket are alternately deployed in drive mode and rearwardly freely-rotating mode for continuously propelling said pedal-operated vehicle in a forward direction and maintaining tension in said front cable sprocket chain and said rear cable sprocket chain, respectively, responsive to pivotal movement of said pedal means by an operator and tension in said bias means.

10. The pedal-operated vehicle of claim 9 wherein said pedal means further comprises a slightly concave pedal.

11. The pedal-operated vehicle of claim 9 wherein said bias means further comprises a coil spring.

12. The pedal-operated vehicle of claim 9 wherein:
(a) said pedal means further comprises a slightly concave pedal; and
(b) said bias means further comprises a coil spring.

13. The pedal-operated vehicle of claim 9 wherein said front cable pulley means further comprises a first front cable pulley rotatably carried by said frame beneath said front end of said pedal means and a second front cable pulley rotatably carried by said frame beneath said rear end of said pedal means, said rear cable pulley means further comprises a rear cable pulley rotatably carried by said frame beneath said rear end of said pedal means in spaced relationship with respect to said second front cable pulley, said bias means further comprises a spring and said bias pulley means further comprises at least one spring pulley.

14. The pedal-operated vehicle of claim 13 wherein said pedal means further comprises a slightly concave pedal.

15. The pedal-operated vehicle of claim 13 wherein said bias means further comprises a coil spring.

16. The pedal-operated vehicle of claim 13 wherein:
   (a) said pedal means further comprises a slightly concave pedal; and
   (b) said bias means further comprises a coil spring.

17. A pedal-operated scooter comprising a scooter frame and a front wheel fork pivotally carried by the front end of said frame; a front wheel mounted in said front wheel fork; a handle bar carried by said front wheel fork for steering said pedal-operated scooter; a pair of rear wheel mount bars carried by the rear end of said frame, a rear wheel axle carried by said rear wheel mount bars and a rear wheel rotatably mounted on said rear wheel axle; a first sprocket and a second sprocket carried by said rear wheel in spaced, substantially parallel, independently forwardly-driving and reverse freely-rotating relationship; a pair of front cable pulleys and a rear cable pulley rotatably mounted on opposite sides of said frame in spaced relationship; an elongated pedal pivotally mounted on the top of said frame to receive an operator in standing position; a front cable having one end attached to the front portion of said pedal and the opposite end of said front cable extending around said front cable pulleys, respectively, said opposite end of said front cable terminating rearwardly of said front cable pulleys; a front cable sprocket chain engaging said first sprocket and having one end attached to said opposite end of said front cable; a rear cable having one end attached to said rear portion of said pedal and the opposite end of said rear cable extending around said rear cable pulley; a rear cable sprocket chain engaging said second sprocket and having one end attached to said opposite end of said rear cable; at least one spring pulley rotatably carried by said rear wheel mount bars in spaced relationship; and a coil spring engaging said spring pulley and connecting the opposite ends of said front cable sprocket chain and said rear cable sprocket chain, whereby said first sprocket and said second sprocket are alternately disposed in said forwardly-driving and reverse freely-rotating relationship to continuously propel said pedal-operated scooter in a forward direction while maintaining tension in said front cable sprocket chain and said rear cable sprocket chain, responsive to pivotal rocking movement of said pedal by an operator and the tension in said coil spring, respectively.

18. The pedal-operated scooter of claim 17 wherein said pedal is slightly concave from said front portion to said rear portion.

19. The pedal-operated scooter of claim 17 wherein said at least one spring pulley is a pair of spring pulleys disposed on said rear wheel mount bars in spaced relationship.

20. The pedal-operated scooter of claim 19 wherein said pedal is slightly concave from said front portion to said rear portion.

* * * * *